United States Patent [19]
Zortea

[11] Patent Number: 5,376,963
[45] Date of Patent: Dec. 27, 1994

[54] NEURAL NETWORK VIDEO IMAGE PROCESSOR

[75] Inventor: Anthony E. Zortea, Reading, Pa.

[73] Assignee: Panasonic Technologies, Inc., Secaucus, N.J.

[21] Appl. No.: 40,407

[22] Filed: Mar. 31, 1993

[51] Int. Cl.$^5$ .............................................. H04N 9/64
[52] U.S. Cl. ................................... 348/222; 348/708; 395/21
[58] Field of Search ................. 358/160, 21 R, 41, 10, 358/139; 382/14, 15; 395/20, 22, 27, 21, 23; 348/222, 708, 223; H04N 9/64

[56] References Cited

U.S. PATENT DOCUMENTS

| | | | |
|---|---|---|---|
| 5,005,206 | 4/1991 | Naillon et al. | 382/15 X |
| 5,053,974 | 10/1991 | Penz | 382/15 X |
| 5,161,014 | 11/1992 | Pearson et al. | 358/160 |
| 5,161,203 | 11/1992 | Buckley | 382/15 |
| 5,168,352 | 12/1992 | Naka et al. | 358/81 |
| 5,184,218 | 2/1993 | Gerdes | 358/140 X |
| 5,214,745 | 5/1993 | Sutherland | 395/23 X |
| 5,216,250 | 6/1993 | Smith | 382/15 X |
| 5,216,463 | 6/1993 | Morita | 395/23 X |
| 5,255,347 | 10/1993 | Matsuba et al. | 395/23 |

OTHER PUBLICATIONS

Hecht-Nielsen, Robert, Theory of the Backpropagation Neural Network, *IEEE Joint Conf. on Neural Networks*, vol. 1, at pp. 1593-1605.

Parulski, K. A. et al., "A Digital Color CCD Imaging System Using Custom VLSI Circuits", *IEEE Transactions on Consumer Electronics*, vol. 35, No. 3, at pp. 382,388 (Aug. 1989).

Lu, Cheng-Chang and Yong Ho Shin, "A Neural Network Based Image Compressions System", *IEEE Transactions on Consumer Electronics*, vol. 38, No. 1, at pp. 25-29 (Feb. 1992).

Wilson, Stephen S., "Neural Computing on a One Dimensional Simd Array", *Parallel and Distributed Processing*, at pp. 206-211.

Hertz, Krough & Palmer, "6.1 Back-Propagation", *Introduction to the Theory of Neural Computation*, at pp. 119-120 (1991).

*Primary Examiner*—Victor R. Kostak
*Attorney, Agent, or Firm*—Ratner & Prestia

[57] ABSTRACT

A signal processing system for a video camera uses a single neural network to implement multiple nonlinear signal processing functions. In one example, the neural network implements gamma correction and contrast compression, in another example, color correction and aperture correction are added to the combined function emulated by the network. The network is trained using back propagation to emulate one function then a combination of two functions, then a combination of three functions, and so on. The programmed neural network replaces multiple pipelined signal processors in the video camera. The use of a single neural network in place of the multiple dedicated processing functions reduces engineering effort to develop the product and may reduce the cost of the total system.

12 Claims, 11 Drawing Sheets

NEURAL NETWORK VIDEO IMAGE PROCESSOR

BACKGROUND OF THE INVENTION

The present invention concerns apparatus and a method for processing video signals to implement a plurality of signal processing functions in a single operation, and in particular to apparatus which uses a neural network to perform these functions.

In many signal processing systems, functions are applied to data sequentially. That is to say one function is applied to the input data and the output values produced by that function are applied as the input values to the next function. This type of processing is commonly referred to as pipeline processing.

An exemplary system which employs pipeline processing is a video camera. One such camera is described in an article by K. A. Parulski et al. entitled "A Digital Color CCD Imaging System Using Custom VLSI Circuits," *IEEE Transactions on Consumer Electronics*, Vol. 35, No. 3, pp. 382-389, August, 1989.

The camera described in this paper employs a CCD sensor which collects samples representing successive video images. These samples are then digitized and processed by a color filter array (CFA) signal processor and a red, green, blue (RGB) signal post-processor. The CFA processor generates, from the single image samples provided by the CCD device, a complete set of Red (R), Green (G) and Blue (B) samples. In addition, the CFA processor performs color balance corrections on the RGB signals. The RGB post-processor performs black-level adjustments, gamma correction and aperture correction.

As described in the referenced article, the circuitry used to perform these processing functions is implemented in two VLSI integrated circuits. These circuits represent a relatively large amount of special purpose circuitry produced only after an expensive development cycle.

In addition to requiring a relatively large amount of special purpose circuitry, systems such as that shown in the referenced paper introduce a delay in their processing paths due to the pipelining of the signal processing operations. Parallel signal processing paths may exist in the system, for example, if audio information from the observed scene were being processed in parallel with the video information. The delays caused by the pipeline processing of the video information are desirably compensated for in the audio signal processing circuitry.

While the delays for the referenced video camera processing circuitry are relatively small, other video signal processing apparatus may employ one or more frame delay elements in its processing circuitry. These elements introduce more substantial delays for which compensation is more difficult.

Furthermore, in systems of the type described in the referenced article, there is an inherent conflict between the precision of the design and its cost, as reflected by its complexity. Many of the processing steps performed in a video camera are modeled as relatively simple mathematical functions, even though these functions do not strictly conform to the desired processing steps. These functional models are used only because it would not be cost effective to implement the desired processing steps according to a more rigorous model or to implement multiple independent functions as a single model.

SUMMARY OF THE INVENTION

The present invention is embodied in apparatus and a method which utilizes a neural network to perform a group of independent signal processing functions as a single, combined function. The neural network includes a plurality of input processors which receive the signals to be processed and parameters that define the processing steps to be performed. The network also includes one or more layers of hidden processors and a layer of output processors. The output processors provide the processed output signals.

According to one aspect of the invention, the neural network is trained to implement a first function of the group and then is retrained for each other function in the group which is to be combined with the initial function.

According to yet another aspect of the invention, a plurality of sets of weighting functions are defined for the neural network, each set corresponding to a respectively different set of input value ranges for the control parameters.

BRIEF DESCRIPTION OF THE DRAWINGS

FIG. 9 is a flowchart diagram which is useful for describing the programing of the neural networks shown in FIGS. 4 and 4a.

DETAILED DESCRIPTION

Overview

Figure 1:
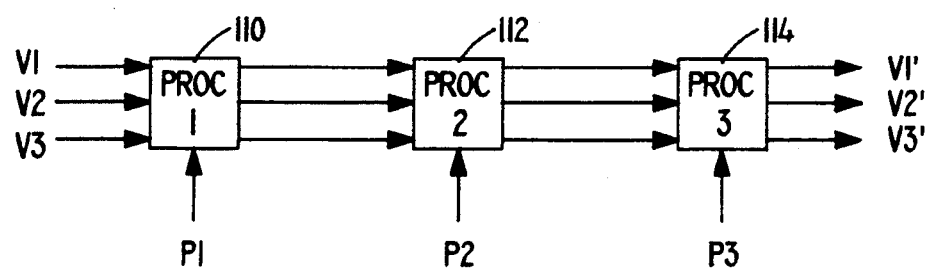
FIG. 1 (prior art) is a block diagram of an exemplary pipeline processing system.

FIG. 1 shows a typical pipeline signal processing system. In this system, three input signals, V1, V2, and V3 are processed sequentially by processors 110, 112 and 114 to produce three output signals V1', V2' and V3'. In this example, the processors 110, 112 and 114 are controlled by parameters P1, P2 and P3 respectively. In the system shown in FIG. 1, each of the processors 110, 112 and 114 is independent; each performs a well-defined operation on its input data values to produce its output data values.

Figure 2:
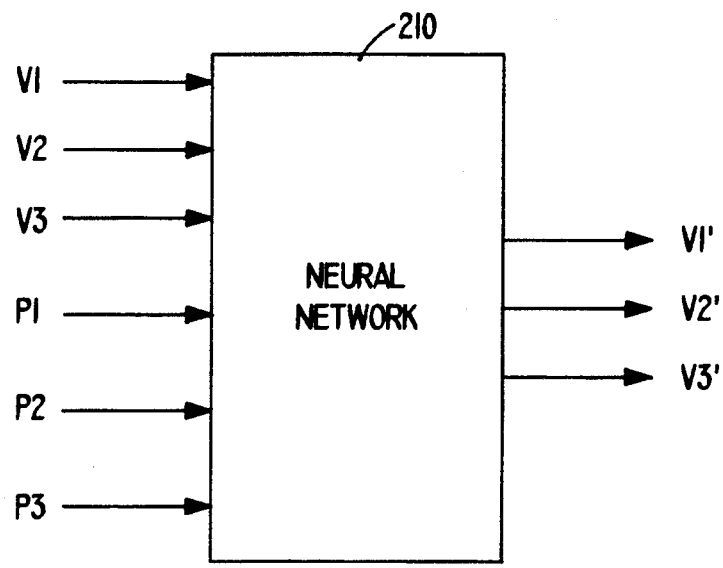
FIG. 2 is a block diagram which illustrates how the pipeline processing system of FIG. 1 may be implemented using a neural network.

One of the underlying ideas of the subject invention is to replace a system such as that shown in FIG. 1 by an otherwise equivalent system, such as that shown in FIG. 2. In FIG. 2 the neural network 210 is coupled to receive both the data signal inputs V1, V2 and V3 and the parameter input signals P1, P2 and P3 as inputs. The neural network 210 produces the output signals V1', V2' and V3' as in FIG. 1.

The system shown in FIG. 2 has many advantages over that shown in FIG. 1. First, all three processes are implemented using a single set of hardware. This reduces development and design time and, depending on the relative complexity of the various systems, may also reduce cost. Second, a single failure in one of the processors 110, 112 and 114 may render the entire system shown in FIG. 1 inoperative whereas a single failure in the system shown in FIG. 2 may leave many of the output values unaffected for a given set of input values. Third, if each of the processes performed by the processors 110, 112 and 114 is highly subjective or is poorly modeled by conventional single processing techniques, there may be advantages in implementing the processes on a neural network since the neural network allows the function to be implemented at a higher level of the abstraction; that is to say, not confined to any overly simplified mathematical model.

In the materials that follow, the video signal processing system is described in the context of a video camera. It is contemplated, however, that the described invention may have more general application in video signal processing. It is also contemplated that the invention may have general application in non-video signal processing where the processing steps are performed sequentially and the actual processes performed are more subjective than objective.

Detailed Description of the Exemplary Embodiments

Figure 3:
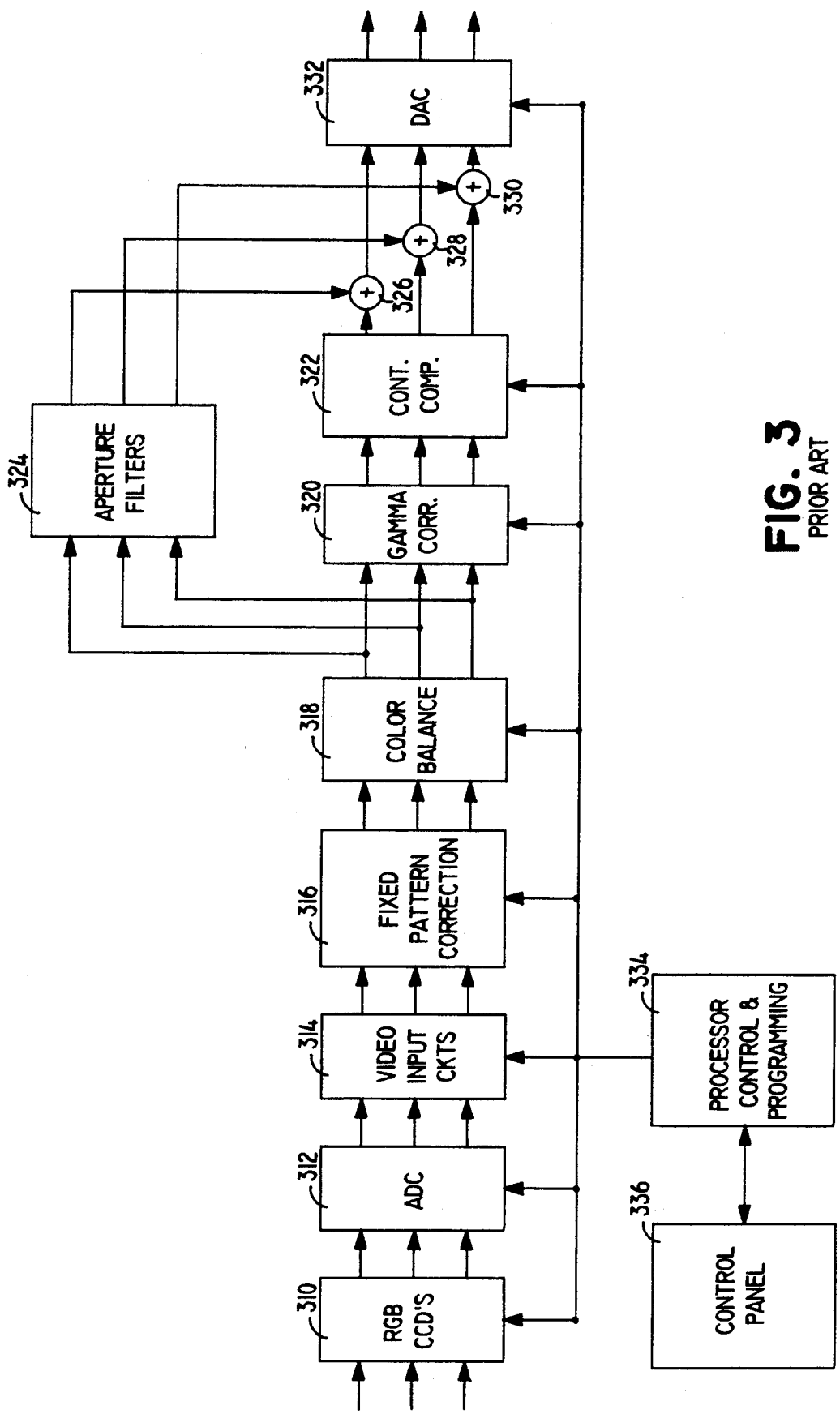
FIG. 3 (prior art) is a block diagram of an exemplary video signal processing system which may be used in a video camera.

FIG. 3 is a block diagram of an exemplary digital video camera system. In the Figure, light from a scene is focused onto separate red, green and blue Charge Coupled Devices (CCD) imagers 310. The CCD imagers 310 produce analog sampled data signals representing, respectively, the red, green and blue color components of the scene, as an image of the scene is focused on the CCD imager. These signals are applied to an Analog to Digital Converter (ADC) 312 which converts the simple data analog signals to digital sample data signals.

The digital signals produced by the ADC 312 are applied to video input circuits 314. In this exemplary circuit, the video input circuits are latches which are used to synchronize the digital values provided by the ADC 312 to the remainder of the camera signal processing circuitry.

The first signal processing step after analog-to-digital conversion is the fixed pattern correction step, which is performed by the processor 316. This step may, for example, store an image corresponding to the dark current provided by the CCD imagers 310 (i.e. the charge values produced by the CCD in the absence of light) and subtract this dark current image from the image signals provided by the video input circuit 314.

The output signals produced by the fixed pattern correction circuitry 316 are applied to a color-balance processor 318. The processor 318 adjusts relative amplification factors for each of the red, green and blue signals so that the brightest object in the camera's field of view will appear white on the reproduced image.

The color balance calibration is generally performed only once, during the initial camera set up. The amplification or gain factors developed in this calibration step, however, are applied to the red, green and blue signals provided by the pattern correction circuitry 316 during the remainder of normal imaging operation.

The output signals provided by the color balance processor 318 are applied in parallel to a set of aperture filters 324 and to a gamma correction processor 320. The gamma correction processor 320 applies a function Γ(x) to the sample values x. This function is shown in equation (1).

$$\Gamma(x) = x\gamma \tag{1}$$

The output values produced by the gamma correction processor 320 are applied to a contrast compressor 322. The contrast compressor 322 applies a function CC(x), where x represents the individual R, G and B signals, as shown in equation (2).

$$CC(x) = \frac{(MAX(R, G, B))^{cont}}{MAX(R, G, B)} x \tag{2}$$

The aperture filters 324 extract and amplify high frequency components from some combination of the R, G and B signals and apply these amplified high frequency components to each of the red, green and blue signals provided by the contrast compression circuitry 322. The aperture correction signal is combined with the red, green and blue signals by the adders 326, 328 and 330 respectively. These combined signals are then converted to analog signals by a digital to analog converter (DAC) 332.

The video input circuits 314, fixed pattern correction circuitry 316, color balance processor 318, gamma correction processor 320, contrast compression processor 322, and aperture filters 324 are controlled by the process control programming circuitry 334. This circuitry receives information from, and provides status information to a control panel 336. In addition to controlling the above processor control and programming circuitry 334 also generates clock signals and other timing signals for the CCD imagers 310, the ADC 312 and the DAC 332.

Figure 4:
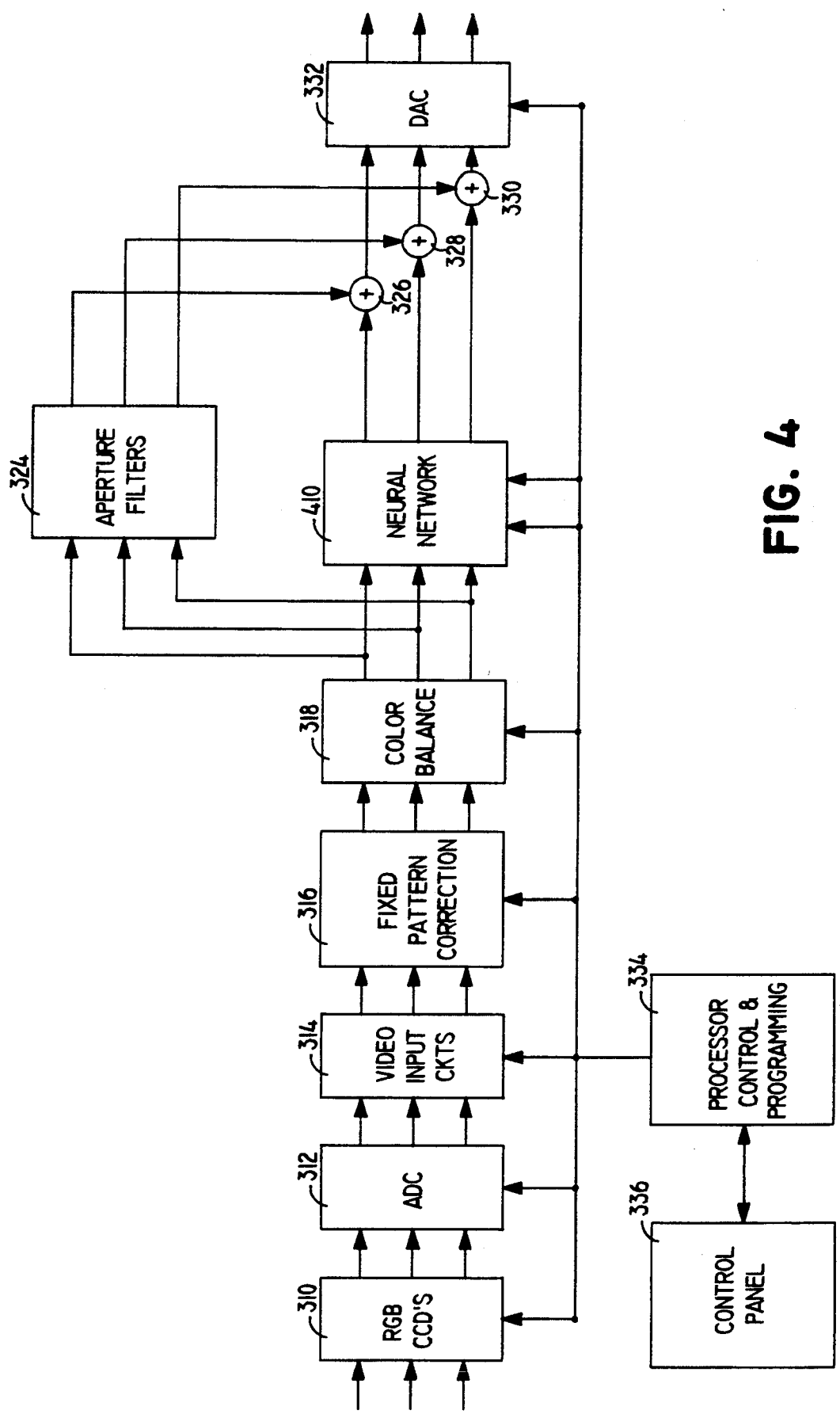
FIG. 4 is a block diagram of a video camera signal processing system which includes an embodiment of the present invention.

FIG. 4 is a block diagram of an exemplary video camera which includes an embodiment of the present invention. This camera is the same as that shown in FIG. 3 except that the gamma correction processor 320 and contract compression processor 322 are replaced by a single neural network 410.

Figure 4A:
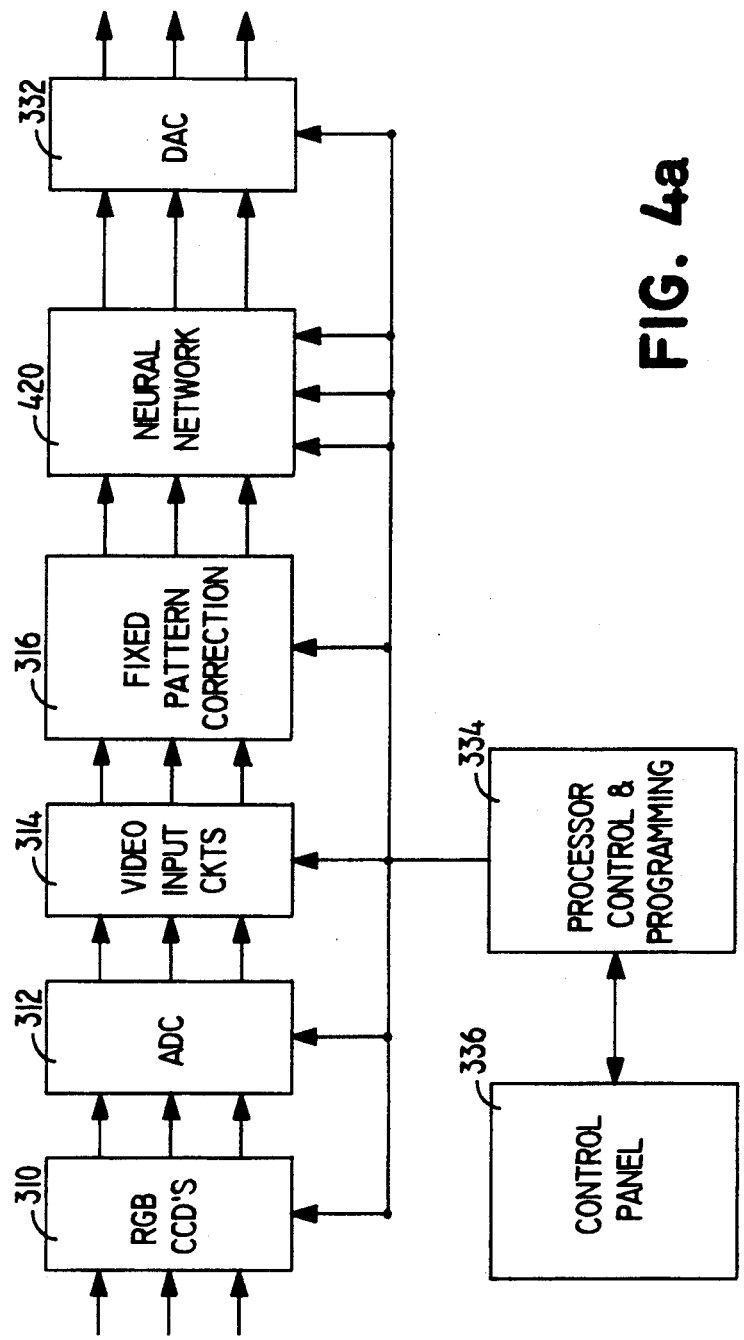
FIG. 4a is a block diagram of a video camera signal processing system which includes an alternative and more general embodiment of the present invention.

FIG. 4a shows another video camera configuration which is the same as that shown in FIG. 3 except that a neural network 420 replaces the color balance processor 318, gamma correction processor 320, contrast compression processor 322, aperture filters 324 and adders 326, 328 and 330.

Disregarding, for the moment, the complexity of the neural networks 410 and 420, the circuitry shown in FIGS. 4 and 4a is simpler than the circuits in FIG. 3 simply because it includes fewer components. In addition, as described below, the engineering effort needed to produce acceptable signal processing from the circuits shown in FIGS. 4 and 4a may be considerably less than that needed to produce the same level of performance from the circuits shown in FIG. 3.

Even when the complexity of the neural network is considered, the circuitry shown in FIGS. 4 and 4a may be less costly than that shown in FIG. 3 since the neural networks 410 and 420, or the processing elements which make up the networks, may be off-the-shelf items and, thus, may benefit from volume discounts. In addition, the neural network may be designed to use multiple identical processing elements.

For the sake of simplicity only the embodiment of the invention shown in FIG. 4 is described below. This embodiment, however, is described with sufficient guidance to enable one ordinary skill in the art to implement the circuit shown in FIG. 4a.

In FIG. 4 the gamma correction and contrast compression functions are combined and performed by the neural network 410. The combination of these two functions is highly nonlinear. The gamma correction function, defined by equation (1), and the contrast compression function, defined by equation (2), are combined as shown in equations (3), (4) and (5) to produce the respective signals r', g' and b' from the input color signals r, g and b and the control parameters $\gamma$ and cont.

$$r' = \left( \frac{(MAX(r, g, b))^{cont}}{MAX(r, g, b)} r \right)^{\gamma} \quad (3)$$

$$g' = \left( \frac{(MAX(r, g, b))^{cont}}{MAX(r, g, b)} g \right)^{\gamma} \quad (4)$$

$$b' = \left( \frac{(MAX(r, g, b))^{cont}}{MAX(r, g, b)} b \right)^{\gamma} \quad (5)$$

In these equations, the signals r', g' and b' are the result of performing gamma correction and contrast compression on the respective r, g and b input signals. This combined process is very nonlinear since it involves multiple exponentials and maximums. In addition one of the output color output signals can change if the corresponding input color signal is the same but one of the other input color signals has changed.

Furthermore, the equations do not lend themselves to being implemented easily either in analog or digital circuitry. The equations (3), (4) and (5) are too complex to be effectively implemented using conventional analog signal processing circuitry. While it may be simpler to implement the equations using a programmed digital processor, the complexity of the operations performed would require either excessive signal processing delays or an overly complex processor. Finally, if the function is implemented as a large look up table (LUT) the amount of memory needed to hold the LUT even for eight-bit input values would be so large ($2^{(8*5)} = 2^{40} \approx 1.1 * 10^{12}$) as to make the device impractical.

Figure 5:
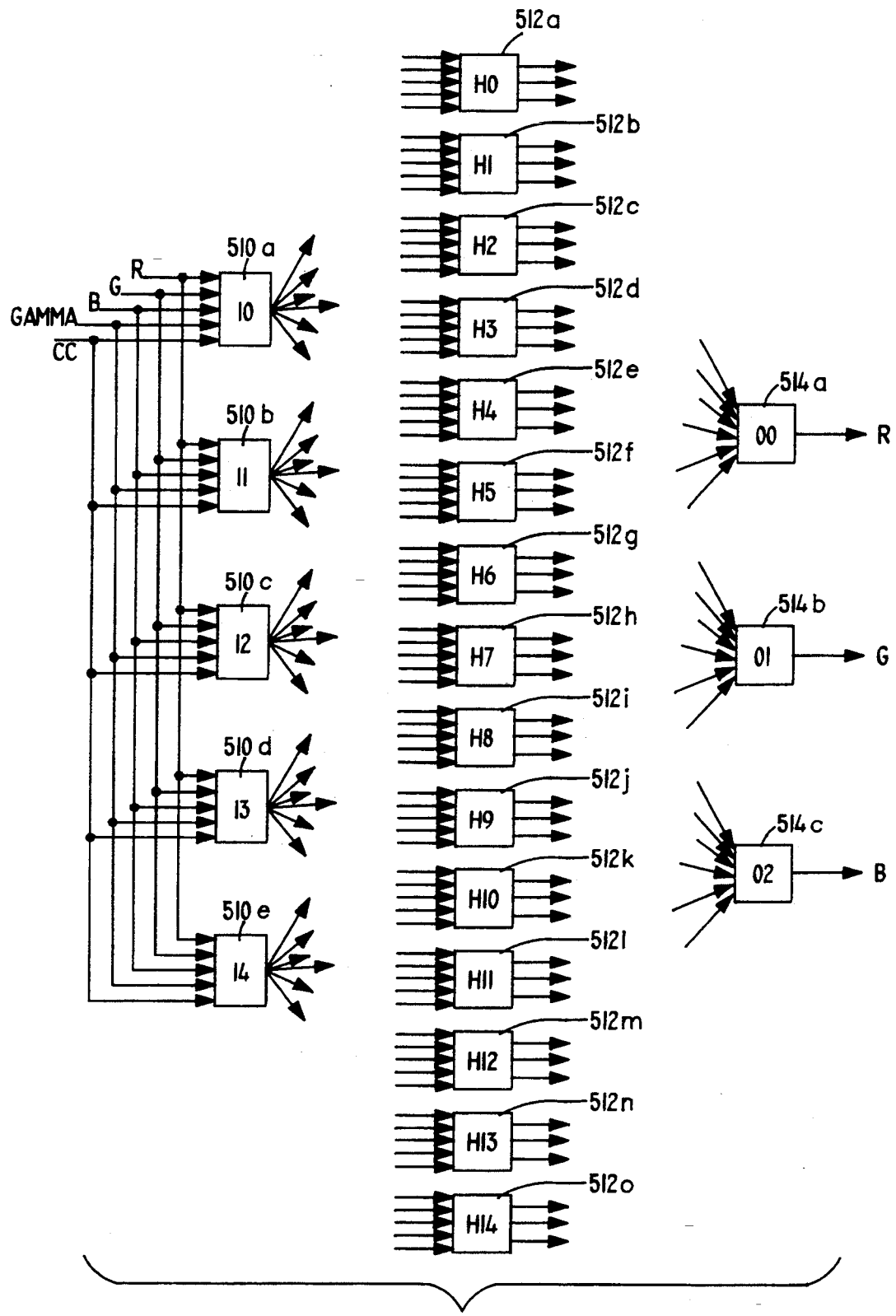
FIG. 5 is a block diagram of a neural network suitable for use in the video camera system shown in FIG. 4.

FIG. 5 is a block diagram of a neural network which is suitable for use as the network 410. This network includes three layers of processors, input processors 510a through 510e, hidden processors 512a through 512o and output processors 514a through 514c. Each of the input processors, for example 510a, receives all of the input signals, the color signals R, G and B and the control signals $\gamma$ and cont. Each input processor in turn provides its output signal to all of the hidden processors 512a through 512o. Each hidden processor, for example 512a, produces three output signals, one of which is applied to output processor 514a another, to 514b and the third, to output processor 514c. The output processors 514a, 514b and 514c produce the respective processed color signals r', g' and b'.

Since the aperture correction function is a spatial filtering operation, it may be desirable for the neural network 420 to include circuitry which stores multiple lines of video samples so that samples which are displayed on either side of the one sample which is being processed as well as samples which are displayed above and below the one sample are applied as input values to the neural network. Accordingly, the neural network 420 may have more input terminals than the network 410. In addition, due to the increased complexity of the multiple functions being emulated by the network 420 over those emulated by the network 410, it may be desirable to use a larger number of input, and hidden processors in the network 420 than are used in the network 410. Instead of using only one layer of hidden processors, it may also be desirable to expand the network to use multiple hidden layers.

Referring again to FIG. 5, each processor in the network calculates successive weighted sums of successive values applied to its input ports and then transforms the weighted sums through a sigmoidal transfer function to produce its output value. For the input and hidden processors, these output values are applied to all of the processors in the next stage. For the output processors, these output values are the signals r', g' or b'.

Figure 6:
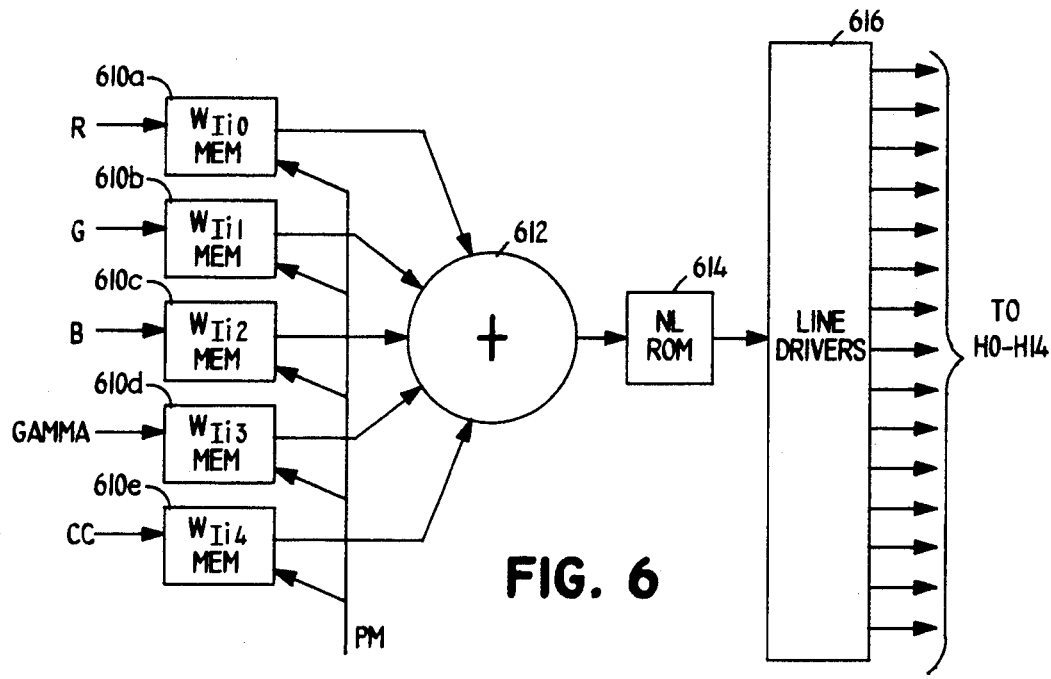
FIG. 6 is a block diagram of an exemplary input layer processor suitable for use in the neural network shown in FIG. 5.

FIG. 6 is a block diagram of circuitry suitable for use as one of the input processors, for example, processor 510a. In FIG. 6, samples of the three color signals r, g and b and samples of the control signals $\gamma$ and cont are applied to each of the weighting circuits 610a, 610b, 610c, 610d and 610e. The respective weighting factors applied by these circuits are $W_{Ii0}$, $W_{Ii1}$, $W_{Ii2}$, $W_{Ii3}$ and $W_{Ii4}$, where the subscript I indicates that these are weighting factors from an input processor and the subscript i identifies the particular input processor. These weighting factors are programmable via a programing bus PM. In the exemplary embodiment of the invention each of the circuits 610a through 610e may be a dedicated multiplier circuit in which the programmable weighting factor is applied to the multiplier input port and the respective input signal (r, g, b, $\gamma$ or cont) is applied to the multiplicand input port.

Alternatively, the circuits 610a through 610e may be implemented as respective memories (not shown) each programmed with a set of values that implement the multiplication by the weighting factor. If, for example, the color signals are eight-bit signals, each of the memories 610a through 610e would hold 256 values representing each possible result that could be obtained from multiplying the input signal (applied to the address input port) by the programmed weighting factor.

The weighted output samples provided by each of the weighting circuits 610a through 610e are applied to a summing circuit 612. In a digital embodiment of the invention, the summing circuit 612 may be implemented as a tree of adders.

The output samples provided by the summing circuit 612 are applied to a circuit 614 which implements a nonlinear transfer function. In the exemplary embodiment of the invention, the circuit 614 is a Read-Only Memory (ROM) which is programmed to transform the input value supplied as addresses to output values substantially equal to the input values as modified by the transfer function. In the exemplary embodiment of the invention the transfer function implemented by the circuitry 614 is a sigmoidal function $g\beta(x)$ having the form shown in equation (6).

$$g\beta(x) = \frac{1}{1 + e^{-\beta x}} \quad (6)$$

In this embodiment of the invention, the function $g\beta(x)$ is implemented with $\beta$ having a value of 1. In the materials that follow, this function is referred to as simply $g(x)$.

The output signal of the nonlinear circuit 614 is applied to a line driver circuit 616 which generates 15 copies of the output signal for application to each of the hidden processors 512a through 512o, shown in FIG. 5.

Figure 6A:
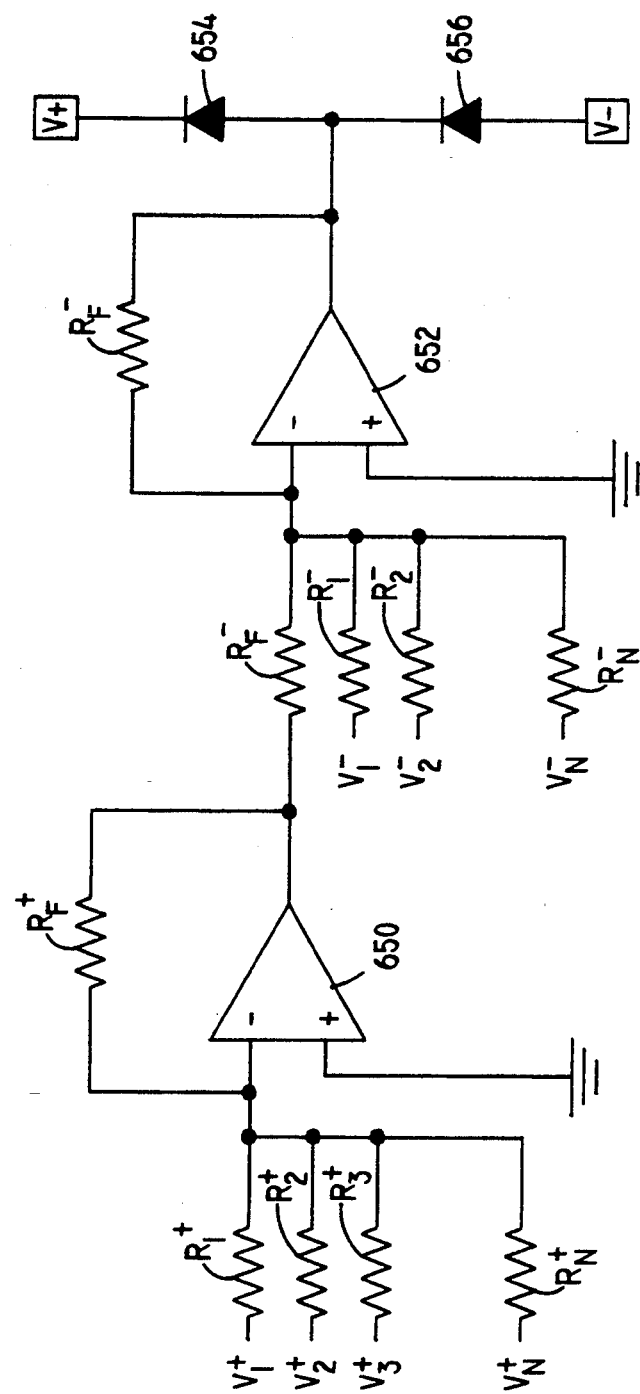
FIG. 6a is a schematic diagram of an exemplary analog processor which may be used as one of the input layer, hidden layer or output layer processors of the network shown in FIG. 5.

FIG. 6a shows an exemplary analog implementation of the weighting circuits one of the processors shown in FIG. 5. As shown in this figure, the input potentials $V_1^+, V_2^+, \ldots V_N^+$ and $V_1^-, V_2^-, \ldots V_N^-$ are summed in respective resistor networks ($R_1^+$ through $R_N^+$ and $R_1^-$ through $R_N^-$) and applied to respective summing amplifiers, 650 and 652. The weighting factor applied to each input signal is the ratio of the appropriate feedback resistor ($R_f^+$ and $R_f^-$) to the input resistor. The output signal, $V_{out}$, produced the circuit shown in FIG. 6a may be represented by equation (7).

$$V_{out} = g_o \left( \sum_{i=1}^{N} \frac{R_f^+}{R_i} V_i^+ - \sum_{i=1}^{N} \frac{R_f^-}{R_i} V_i^- \right) \quad (7)$$

where $V_i^+$ represents an input signal which is to receive a positive weight, $R_i^+$; $V_i^-$ represents an input signal which is to receive a negative weight, $R_i^-$; and $g_o$ represents the non-linear function implemented by the two diodes 654 and 656.

Figure 7:
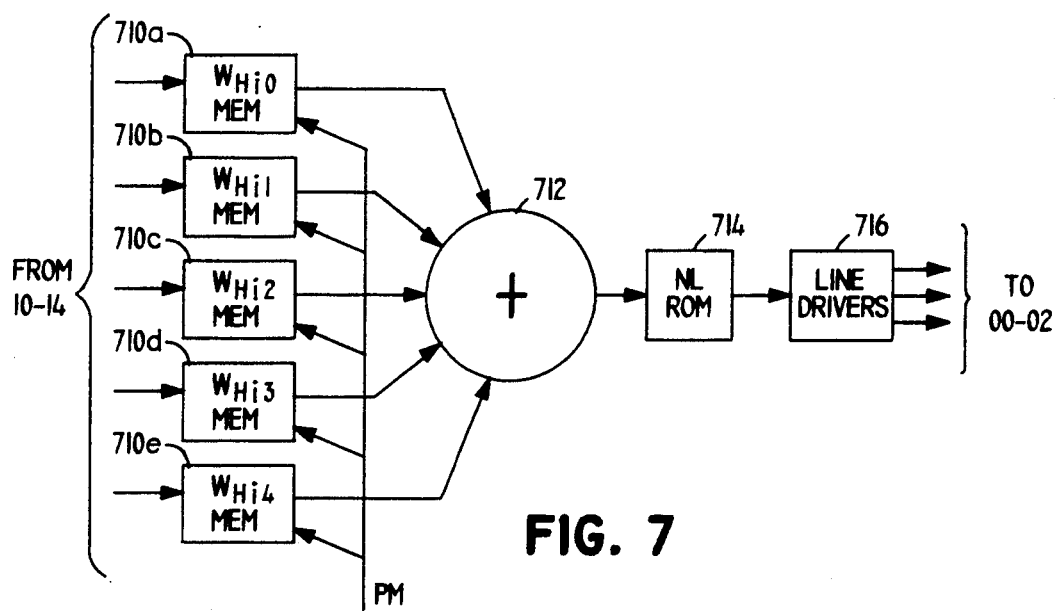
FIG. 7 is a block diagram of a hidden layer processor suitable for use in the neural network shown in FIG. 5.

An exemplary hidden processor is shown in FIG. 7. This circuit is the same as the circuitry shown in FIG. 6 except that each of the weighting circuits 710a through 710e receives an input signal from a respectively different one of the input processors 510a through 510e, shown in FIG. 5. Each of the weighting factors, $W_{Hi0}$ through $W_{Hi4}$, held by the respective weighting circuits 710a through 710e is independently programmable via the programming bus PM. In the notation for these weighting factors, the subscript H indicates that these are hidden processor factors and the subscript i designates a particular hidden processor.

In addition, the circuit shown in FIG. 7 differs from that shown in FIG. 6 because the line driver 716 of the hidden processor generates only three copies of the output signal. These three output signals are applied to respectively different ones of the output processors 514a, 514b and 514c shown in FIG. 5.

Figure 8:
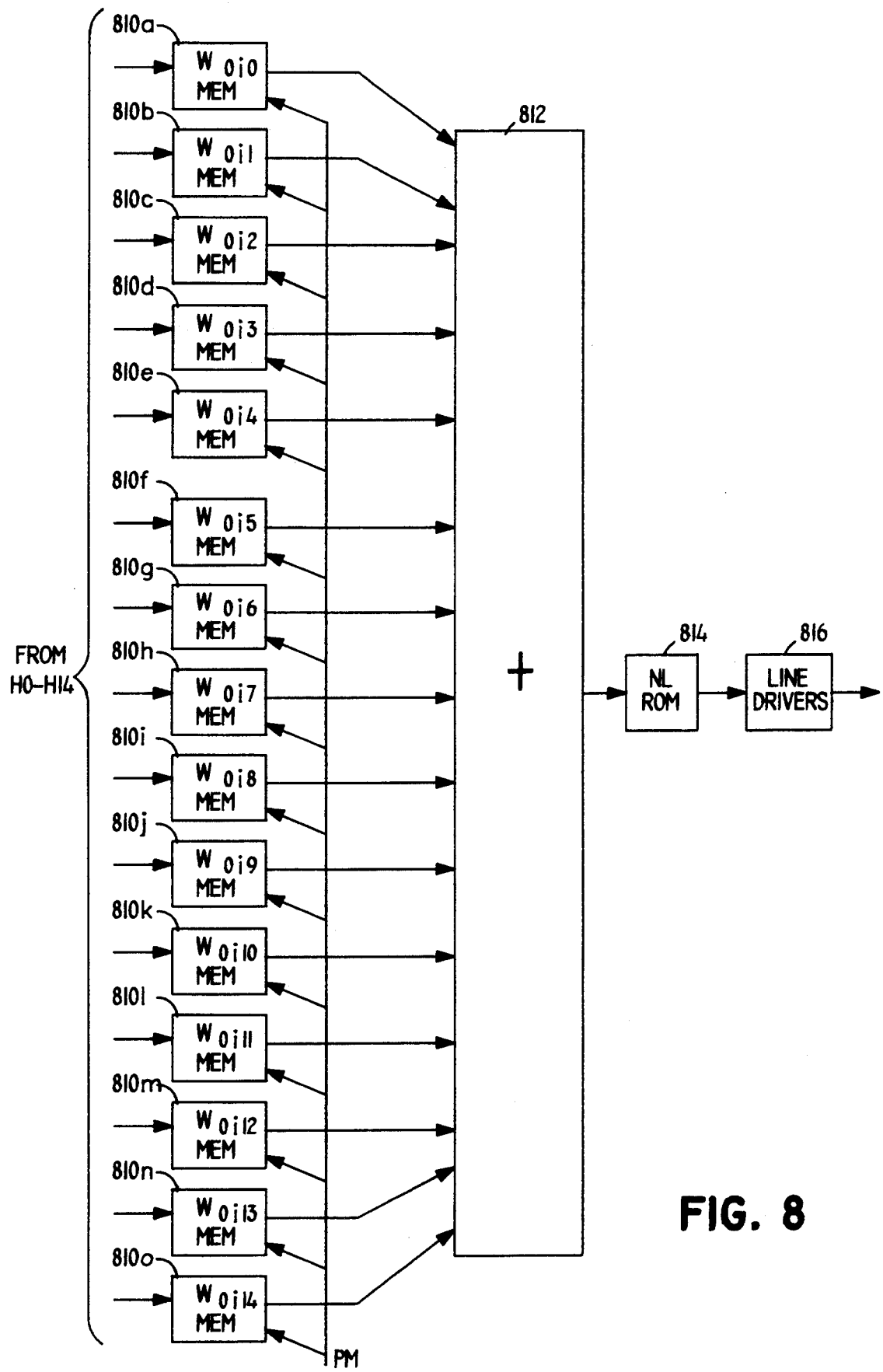
FIG. 8 is a block diagram of an output layer processor suitable for use in the neural network shown in FIG. 5.

FIG. 8 is a block diagram of an output processor suitable for use as one of the processors 514a, 514b and 514c. As shown in the Figure, the output processor has a similar structure to the input processor and the hidden processor. The output processor, however, has 15 input signals and, so, 15 weighting circuits, 810a through 810o. Each of the weighting factors, $W_{Oi0}$ through $W_{Oi14}$, implemented by the respective weighting circuits 810a through 810o is independently programmable via the programming bus PM. In the notation for these weighting factors, the subscript O indicates that these are output processor factors and the subscript i designates a particular output processor. The weighted output values provided by the weighting circuits 810a through 810o are summed in a summing circuit 812.

The output signal of the summing circuit 812 is applied to a nonlinear ROM 814 which may be identical to the nonlinear ROM's 614 and 714 shown in FIGS. 6 and 7 respectively. The output signal provided by the nonlinear ROM 814 is applied to a line driver 816 which generates an output signal having sufficient strength to drive the circuitry to which the output processor 514a, 514b or 514c are coupled.

Referring to FIG. 4, the neural network 410 is programmed to implement the transfer functions of the gamma correction and contrast compression algorithms by programming the values of the weighting factors in each of the input, hidden and output processors. These weighting factors are programmed using a learning algorithm based on a set of known input/output signal combinations. This algorithm determines values of the weighting factors which produce an acceptable approximation of the combined gamma correction and contrast compression transfer function, as defined by equations (3), (4) and (5). One method by which these weighting values are updated, commonly referred to as back-propagation of error, is described below.

Figure 9:
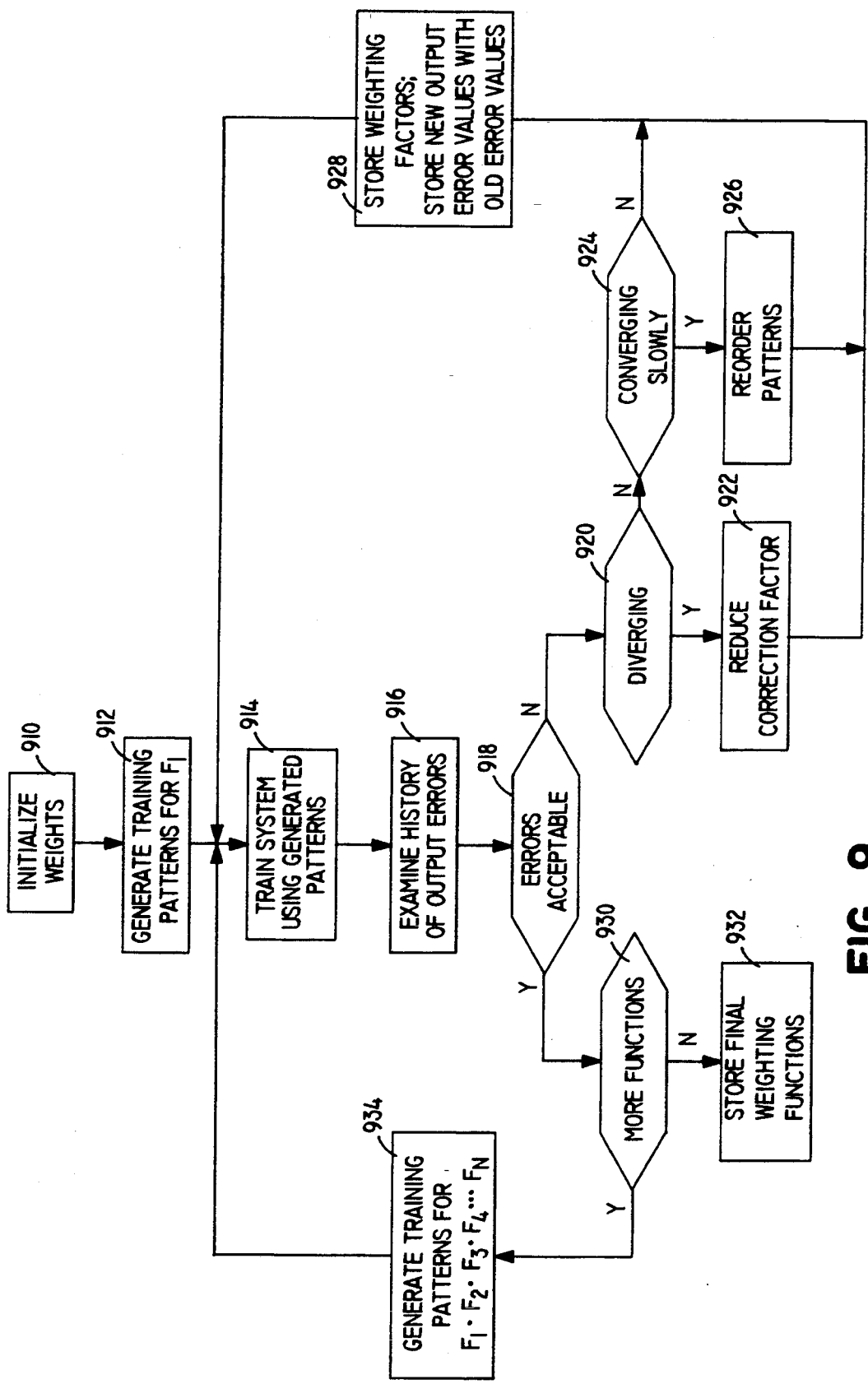
Figure 10:
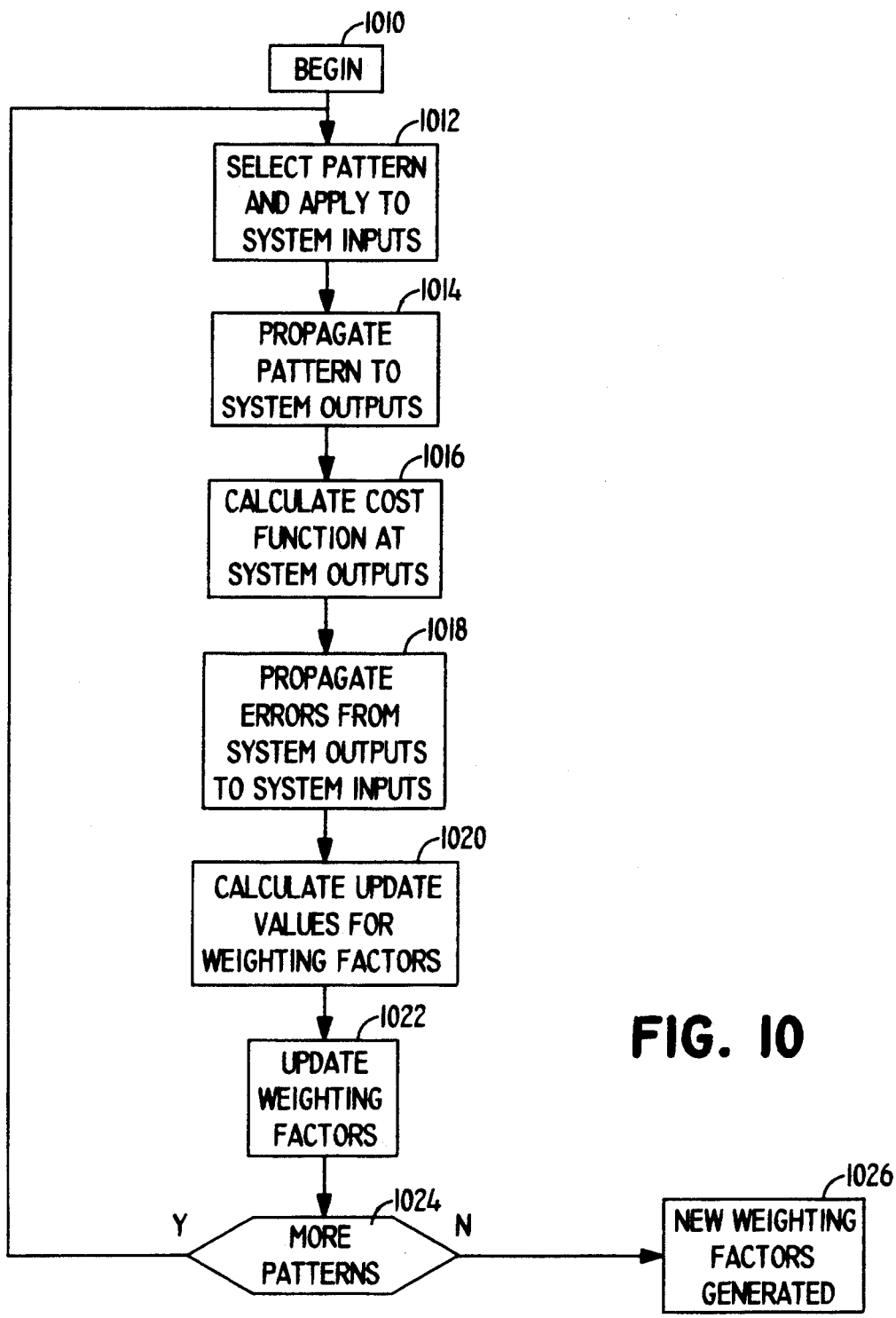
FIG. 10 is a flowchart diagram which is useful for describing the method by which the neural network is trained using the generated patterns, as shown in one of the steps of the flowchart diagram of FIG. 9.

FIGS. 9 and 10 are flow chart diagrams which illustrate the method of updating the weighting values which is used in the exemplary embodiment of the invention. In the exemplary embodiment of the invention, this algorithm is implemented on a general purpose computer on which the neural network 410 is simulated.

At the first step of this method, step 910 of FIG. 9, each of the weighting values in each of the input, hidden and output processors is set to an initial value. Ideally these initial values are relatively small random values which are assigned to the different weighting circuits. These initial values represent a starting point in the search for the best set of weighting values which will implement the desired function.

The next step in the process, step 912, generates a set of training patterns for function $F_1$. In the exemplary embodiment of the invention function $F_1$ may be, for example, the gamma correction function of equation (1) such as may be implemented by the gamma correction processor 320 of FIG. 3.

To produce the test patterns, the program generates multiple sets of random input values of r, g, b and $\gamma$ and applies these values to the gamma equation (1) to obtain the corresponding output values representing the gamma corrected r, g and b color signals. Each set of input values and its corresponding output values forms one training pattern for function $F_1$. When a sufficient number of different patterns have been generated control passes from step 912 to step 914 in which the system is trained using the generated patterns. As described below, in the exemplary embodiment of the invention, the neural network will be trained to implement the transfer function that was used to generate the training patterns by repeatedly applying the patterns to the simulated network. Step 914 represents only one application of the training patterns.

The process performed by step 914 is illustrated in more detail in FIG. 10. After the process has been initiated, at step 1010, control shifts to step 1012 where a pattern is selected and applied to the system inputs. In this instance, since the neural network is being simulated on the computer which is determining values for the weighting factors, the system inputs are actually simulated input terminals of the simulated neural network. The values applied to the simulated input terminals at any given time are the randomly determined values for r, g, b and $\gamma$ from the test patterns produced in step 912, shown in FIG. 9.

After the test input values have been applied in step 1012, they are propagated through the simulated neural network to the simulated output terminals at step 1014. In this step, the simulated neural network, using whatever weighting factors have been currently assigned, processes the input signal values to produce corresponding output signal values.

At step 1016, these propagated output values are compared to the output values from the corresponding test patterns. Each of these comparisons produces an error value representing a difference between the output value produced by the neural network and the pre-calculated output value for the applied input values. It is contemplated that the error value or "cost function" may be calculated in a number of ways. One way would be to calculate the absolute difference between the actual output signal and the desired output signal. Using this method, the cost function at the output port of processor 514a of FIG. 5 would be the arithmetic difference between the actual red signal value, $r_a$, and the desired red signal value, $r_d$ (i.e. $r_a - r_d$).

Another possible cost function would describe signal differences which are important for video signal processing, for example, the difference between the actual and desired color ratios and/or the difference between the actual and desired luminance and color difference values. In this sense, for each of the output processors 514a through 514b of FIG. 5, step 1016 calculates a cost function value, CF, of all of the actual output signals ($r_a$, $g_a$ and $b_a$) and all of the desired output signals ($r_d$, $g_d$ and $b_d$). One such cost function, again for processor 514a is given in equation (8).

$$CF = (r_a - r_d) + \left(\frac{r_a}{g_a} - \frac{r_d}{g_d}\right) + \left(\frac{r_a}{b_a} - \frac{r_d}{b_d}\right) \quad (8)$$

At step 1018, each of these cost function values is propagated backward through the neural network from the simulated system output terminals to the simulated system input terminals. This error propagation is illustrated by equation (9).

$$\oplus_i = g'(x_i) CF(O_{ia}, O_{id}) \quad (9)$$

where $\delta_i$ is the error at the ith output terminal (i.e. the error in the output value produced by the ith output processor) multiplied by the gradient of the nonlinear function, CF is an appropriate cost function value which is calculated from $O_{id}$, the desired output value from the test pattern, and $O_{ia}$, the actual output value produced by the simulated neural network (e.g. the CF calculated in equation (8) or $[O_{ia} - O_{id}]$). In equation (9), $x_i$ is the sum of the weighted input values which were applied to the ith output processor and g'(x) is the first derivative of g(x), which is given in equation (10).

$$g'(x) = 2g(x)[1 - g(x)] \quad (10)$$

At step 1020, an error value for each weighting factor is calculated for each processor in the output, hidden and input stages through back-propagation. These calculations are represented by equation (11).

$$\delta_{k-1,i} = g'(x_{k-1,i}) \Sigma W_{kij} \delta_i \quad (11)$$

where the subscript k designates a particular processor level (i.e. input, hidden or output), the subscript k−1 designates the previous level, the subscript i indicates a particular processor at that level and the subscript j indicates a particular input terminal of the ith processor.

At step 1022, the weighting factors, $W_{Kij}$ are updated by changing their values by a correction term $\Delta W_{kij}$ which is determined in accordance with equation (12).

$$\Delta W_{kij} = \eta \delta_{k,i} V_{k-1,j} \quad (12)$$

where $\eta$ is a correction factor which determines the rate at which the values of the weighting factors are allowed to change, and $V_{k,i}$ is the output value produced by the jth processor at level k. Once the weighting factors have been updated, the processing for this instance of this pattern is complete.

At step 1024, the simulation system determines if there are more patterns to be applied in this step. If so, control transfers to step 1012 to select the next input pattern and to apply its input values to the simulated system inputs. Otherwise, if no more patterns are to be applied, control transfers to step 1026 wherein the weighting factors generated by the process shown in FIG. 10 are marked as the new weighting factors for the neural network.

Returning to FIG. 9, after step 914, step 916 examines the history of the output errors produced by using the last several sets of weighting factors. In the exemplary embodiment of the invention, this is done by running the simulator, programmed with each of the sets of weighting factors that were generated using the last selected set of patterns, and comparing the output values generated by the simulated neural network to the respective desired output values contained in the generated training patterns.

Next, step 918 is invoked to determine if the errors are within an acceptable range of tolerance. If the errors are not acceptable it may be that the values of the weighting factors are diverging, as determined by step 920. If the weighting factors are diverging, step 922 is invoked to reduce the magnitude of the correction term $\eta$ in equation (11). As described above, by reducing the value of this term, the gain of the feedback system is reduced, causing the values of the weighting factors to change more slowly.

If, at step 920, it is determined that the weighting factor values are not diverging, step 924 is executed to determine if the weighting factor values are converging too slowly. If this is determined at step 924, step 926 is invoked which reorders the patterns in the set. If it is determined that the weighting factors are not converging to slowly at step 924, and after steps 922 and 926, step 928 is invoked which stores the new weighting factors for use by the simulated neural network and stores the error values that were used to generate the factors with the previous error values. The stored error values are used by step 916 as described above. After step 928, control is transferred to back to step 914.

If at step 918, it was determined that the error values for the current set of test patterns are acceptable, step 930 is invoked to determine if there are more functions to be simulated by the neural network. If so, step 934 is executed which generates training patterns for the next combination of functions. In the exemplary embodiment of the invention shown in FIG. 4 only two functions are processed using the neural network, gamma correction and contrast compression. In this case, step 934 would generate training patterns for the combination of $F_1$ (gamma correction) and $F_2$ (contrast compression). In the exemplary embodiment of the invention these combined output functions are described by equations (3), (4) and (5).

In the exemplary embodiment of the invention shown in FIG. 4a, the neural network 420 is used to implement color balance and aperture correction in addition to gamma correction and contrast compression. In this second exemplary embodiment of the invention, step 934 would be invoked a first time to combine the contrast compression function with the gamma correction function, a second time to combine the color balance function with the combined gamma correction and contrast compression function, and a third time to combine the aperture correction function with the combined gamma correction contrast compression and color balance functions. Furthermore, the embodiment of FIG. 4a is general enough to be able to implement additional processes such as colorimetry correction and local histogram equalization.

The neural network may also be used to implement processes which may change from camera to camera but which are invariant in a particular camera. One such process may be to correct the output signal of the imager for aberrations in the lens system or in the imager itself. Once the imager and lens systems are mounted, these aberrations do not change. Accordingly, there would be no need for a control input signal to the neural network for this function. The function to correct for aberrations of this type may be the first of the series of functions to be implemented in the neural network.

Returning to FIG. 9, each invocation of step 934 would be preceded by a process as illustrated by steps 914 through 928 in which the weighting factors for each processor in the neural network are updated using generated patterns for the previous function or combination of functions.

If, when step 930 is executed, it is determined that no more functions need to be simulated, step 932 is executed in which the final weighting functions are stored.

Figure 11:
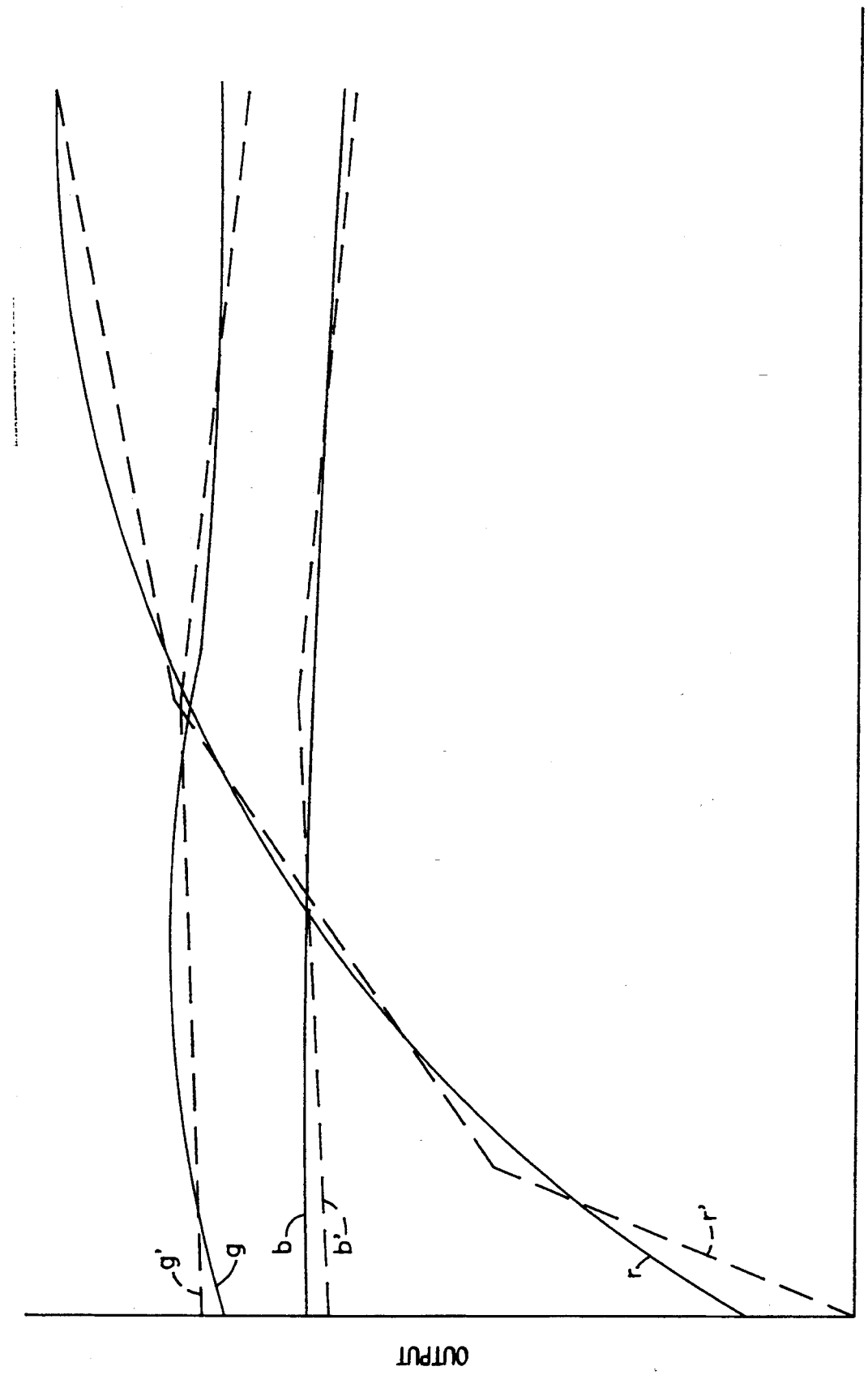
FIG. 11 is a graph of input signal values versus output signal values which illustrates the performance of the system shown in FIG. 4a as compared to an ideal system.

Referring once more to FIG. 4, when the final weighting factors have been stored by the external computer, they are applied to the neural network 410 and the camera circuitry shown in FIG. 4 is ready for operation. FIG. 11 is a graph of input values versus output values which illustrates the correspondence between the calculated red, green and blue signals (r, g and b) and the output values (r', g' and b') produced by the neural network 420 in response to one pair of values of the control parameters $\gamma$ and cont as can be seen in this Figure, there are function values for which the difference between the neural network signal and the desired signal values are different. Because these functions (i.e. gamma and contrast compression) are highly subjective and the models are known to be estimations (especially in the case of gamma correction. These differences between the calculated function values and the values produced by the neural network, however, do not noticeably degrade the quality of the reproduced image.

While the neural network is shown as receiving one set of coefficient values to represent all possible input signal values, it may be desirable to produce multiple coefficient values, one for each of a predefined set of ranges for the control parameters of the various processors (i.e. $\gamma$ and cont). In this alternative embodiment when one of the parameters is adjusted via the control panel 336, as shown in FIG. 4, the weighting values to be used by the neural network 410 would be downloaded into the network via the bus PM. In this alternative embodiment, these weighting values would be changed only when one of the control parameters changed to be in a different one of a predefined range of values, where each range of control parameter values is associated with a distinct set of weighting factor values.

While the invention has been described in terms of an exemplary embodiment it is contemplated that it may be practiced as outlined above within the spirit and scope of the appended claims.

What is claimed:

1. A signal processing system comprising:
   a single neural network having a plurality of programmable weighting factors; a plurality of input terminals for receiving a plurality of input signals and a plurality of control signals, where the control signals are parameters respectively and directly related to first and second nonlinear signal processing functions; and a plurality of output terminals for providing a plurality of output signals;
   means for generating a plurality of test patterns, each containing an input vector, a control vector and an output vector, the output vector representing a desired response of the first and second nonlinear signal processing functions to the input vector;
   simulation means for generating a plurality of values corresponding to the plurality of programmable weighting factors, respectively, the simulation means including:
      means for simulating a response of the neural network to each of the input and control vectors of the plurality of test patterns; and
      means for changing respective simulated values assigned to the weighting factors to conform the simulated response to the output vectors of the test patterns;
   means for applying the simulated values of the weighting factors to the neural network to enable the neural network to emulate the first and second nonlinear signal processing functions.

2. A signal processing system which processes a plurality of input signals according to at least first and second nonlinear signal processing functions to produce a plurality of output signals, the system comprising:
   a neural network having a plurality of programmable weighting factors; a plurality of input terminals for receiving the plurality of input signals, and a plurality of control signals; and a plurality of output terminals for providing the plurality of output signals;
   simulation means for generating a plurality of values, each corresponding to a respectively different one of the weighting factors, including:

means for simulating a response of the neural network to a plurality of test patterns, each pattern containing an input vector, a control vector and an output vector; and means for changing respective simulated values assigned to the weighting factors to conform the simulated response to the output vectors of the test patterns;

means for generating a plurality of first test patterns, each containing an input vector, a control vector and a desired output vector, for the first non-linear function and for applying the first test patterns to the simulation means to produce preliminary values for the plurality of weighting factors;

means for generating a plurality of second test patterns representing a combination of the first and second nonlinear signal processing functions, each pattern in the plurality of second test patterns containing an input vector, a control vector and a desired output vector, and for applying the second test patterns to the simulation means to produce final values for the plurality of weighting factors; and means for applying the final values of the weighting factors to the neural network to enable the neural network to process the input signals according the first and second nonlinear signal processing functions.

3. A system according to claim 2, wherein the simulation means comprises:

a simulator which simulates a response of the neural network to each of the input vectors and control vectors of the test patterns to produce a vector of simulated output values;

means for calculating a plurality of cost function values, each cost function value representing a mathematical function of selected ones of the simulated output values and corresponding desired output values from the desired output vector;

back propagation means, responsive to the cost function values, for modifying each of the programmable weighting factors to minimize differences between respective values in each of the output vectors and the values in the vector of simulated output values; and means for determining when the weighting factors have converged to values which allow the neural network to emulate the signal processing function with acceptable error.

4. A system according to claim 3 wherein each cost function value is a function of all of the simulated output values of the neural network, 5. A system according to claim 3, wherein the system is a color video signal processing system which produces at least first and second color signal values as respective first and second output values in both the simulated and desired output vectors, and the cost function is a function of a difference between a ratio of the simulated first and second output values and a ratio of the desired first and second output values.

6. A system according to claim 3, wherein the system is a color video signal processing system which produces at least first and second color signal values as respective first and second ones of both the simulated and desired output values, and the cost function is a function of a combination of the first and second simulated output values and the first and second desired output values which represents a difference between a first luminance value produced by the simulated output values and a second luminance value produced by corresponding desired output values.

7. A method of processing a plurality of input signals according to at least first and second nonlinear signal processing functions to produce a plurality of output signals, in a system which includes a neural network having a plurality of programmable weighting factors, the method comprising the steps of:

generating a first plurality of test patterns, representing the first non-linear signal processing function, each pattern in the first plurality of test patterns containing an input vector, a control vector and an output vector, for the first non-linear function;

simulating a response of the neural network to the first plurality of test patterns and modifying the weighting factors of the neural network to conform the simulated response of the neural network to the output vectors contained in the first plurality of test patterns to generate a plurality of preliminary values for the weighting factors;

generating a second plurality of test patterns representing a combination of the first and second nonlinear signal processing functions each pattern in the second plurality of test patterns including an input vector, a control vector and an output vector;

simulating a response of the neural network to the second plurality of test patterns and modifying the weighting factors of the neural network to conform the simulated response of the neural network to the output vectors contained in the second plurality test patterns to generate a plurality of final values for the weighting factors;

applying the final values of the weighting factors to the neural network; and processing the input signals using the neural network to produce the output signals.

8. A video signal processing system comprising:

means for providing a plurality of input video information signals;

means for processing the plurality of input video information signals according to first and second nonlinear signal processing functions, wherein the first nonlinear signal processing function is gamma correction and the second nonlinear signal processing function is contrast compression, including:

a neural network including a plurality of processors, each having a programmable weighting factor;

means for generating a plurality of test patterns including respective input values and output values, the output values of each test patterns representing results of processing the respective input values using the first and second nonlinear signal processing functions, wherein the means for generating the plurality of test patterns further includes means for generating a first set of test patterns representing results of processing the input values using only the first nonlinear signal processing function and for generating a second set of test patterns representing results of processing the input values using the second nonlinear signal processing function in combination with the first nonlinear signal processing function; and means for training the neural network using the plurality of test patterns to produce a plurality of values for the respective weighting factors which allow the neural network to emulate the first and second nonlinear signal processing functions, wherein the means for training the neural network includes means for training the neural network using the first set of test patterns and, after the neural network has been trained using the first set of test patterns, for training the neural network using the second set of test patterns;

means for generating a third set of test patterns representing results of processing the input values using a color correction function in combination with the gamma correction function and the contrast compression function; and means for training the neural network using the third set of test patterns after the neural network has been trained using the second set of test patterns to produce a set of values for the plurality of weighting factors to emulate the combined color correction, contrast compression and gamma correction functions.

9. A system according to claim 8 further including means for generating a fourth set of test patterns representing results of processing the input values using an aperture correction function in combination with the gamma correction function, the contrast compression function and the color correction function; and means for training the neural network using the fourth set of test patterns after the neural network has been trained using the third set of test patterns to produce a values for the plurality of weighting factors which allow the neural network to emulate the combined aperture correction, color correction, contrast compression and gamma correction functions.

10. A signal processing system comprising:

a single neural network having a plurality of programmable weighting factors; a plurality of input terminals for receiving a plurality of input signals and a plurality of control signals, wherein the control signals are parameters related to first and second nonlinear signal processing functions and the input terminals of the neural network are coupled to receive signals representing red, green and blue color signals; and a plurality of output terminals for providing a plurality of output signals;

means for generating a plurality of test patterns, each containing an input vector, a control vector and an output vector, the output vector representing a desired response of the first and second nonlinear signal processing functions to the input vector, wherein the first and second nonlinear signal processing functions are gamma correction, and contrast compression;

simulation means for generating a plurality of values corresponding to the plurality of programmable weighting factors, respectively, the simulation means including:

means for simulating a response of the neural network to each of the input and control vectors of the plurality of test patterns; and means for changing respective simulated values assigned to the weighting factors to conform the simulated response to the output vectors of the test patterns;

means for applying the simulated values of the weighting factors as actual weighting factors to the neural network to enable the neural network to emulate the first and second nonlinear signal processing functions.

11. In a color video camera, a signal processing system comprising:

a single neural network having a plurality of programmable weighting factors; a plurality of input terminals for receiving a plurality of input signals and a plurality of control signals, wherein the control signals are parameters related to first and second nonlinear signal processing functions and the input terminals of the neural network are coupled to receive signals representing red, green and blue color signals; and a plurality of output terminals for providing a plurality of output signals;

means for generating a plurality of test patterns, each containing an input vector, a control vector and an output vector, the output vector representing a desired response of the first and second nonlinear signal processing functions to the input vector, wherein the first and second nonlinear signal processing functions are selected from a group consisting of gamma correction, contrast compression, color balance and aperture correction;

simulation means for generating a plurality of values corresponding to the plurality of programmable weighting factors, respectively, the simulation means including:

means for simulating a response of the neural network to each of the input and control vectors of the plurality of test patterns; and means for changing respective simulated values assigned to the weighting factors to conform the simulated response to the output vectors of the test patterns;

means for applying the simulated values of the weighting factors as actual weighting factors to the neural network to enable the neural network to emulate the first and second nonlinear signal processing functions.

12. A video signal processing system comprising:

means for providing a plurality of input video information signals;

means for processing the plurality of input video information signals according to first and second nonlinear signal processing functions, wherein the first nonlinear signal processing function is gamma correction and the second nonlinear signal processing function is contrast compression, including:

a neural network including a plurality of processors, each having a programmable weighting factor;

means for generating a plurality of test patterns including respective input values and output values, the output values of each test patterns representing results of processing the respective input values using the first and second nonlinear signal processing functions, wherein the means for generating the plurality of test patterns further includes means for generating a first set of test patterns representing results of processing the input values using only the first nonlinear signal processing function and for generating a second set of test patterns representing results of processing the input values using the second nonlinear signal processing function in combination with the first nonlinear signal processing function; and means for training the neural network using the plurality of test patterns to produce a plurality of values for the respective weighting factors which allow the neural network to emulate the first and second nonlinear signal processing functions, wherein the means for training the neural network includes means for training the neural network using the first set of test patterns and, after the neural network has been trained using the first set of test patterns, for training the neural network using the second set of test patterns.

* * * * *

UNITED STATES PATENT AND TRADEMARK OFFICE
CERTIFICATE OF CORRECTION

PATENT NO.    : 5,376,963
DATED         : December 27, 1994
INVENTOR(S)   : Anthony E. Zortea It is certified that error appears in the above-identified patent and that said Letters Patent is hereby corrected as shown below:

On Cover Sheet, [56] References Cited, U.S. Patent Documents, delete "5,216,250" for Smith and insert --5,216,750--.

Signed and Sealed this

Sixteenth Day of May, 1995

Attest:

BRUCE LEHMAN

Attesting Officer    Commissioner of Patents and Trademarks